United States Patent
Kulkarni et al.

(10) Patent No.: US 9,651,955 B2
(45) Date of Patent: May 16, 2017

(54) CONTROLLERS AND METHODS OF CONTROL OF WATER HEATERS

(71) Applicant: Emerson Electric Co., St. Louis, MO (US)

(72) Inventors: Amol N. Kulkarni, Pune (IN); Sachin B. Taware, Pune (IN)

(73) Assignee: Emerson Electric Co., St. Louis, MO (US)

( * ) Notice: Subject to any disclaimer, the term of this patent is extended or adjusted under 35 U.S.C. 154(b) by 363 days.

(21) Appl. No.: 14/196,049

(22) Filed: Mar. 4, 2014

(65) Prior Publication Data

US 2015/0039153 A1    Feb. 5, 2015

(30) Foreign Application Priority Data

Aug. 2, 2013  (IN) .......................... 2553/MUM/2013

(51) Int. Cl.
    *G05D 23/19* (2006.01)
    *F24H 9/20* (2006.01)

(52) U.S. Cl.
    CPC ....... *G05D 23/1902* (2013.01); *F24H 9/2014* (2013.01); *F24H 9/2035* (2013.01)

(58) Field of Classification Search
    None
    See application file for complete search history.

(56) References Cited

U.S. PATENT DOCUMENTS

| | | | |
|---|---|---|---|
| 4,214,148 A * | 7/1980 | Fleischhauer | A47J 31/545 219/506 |
| 4,461,949 A * | 7/1984 | Weiser | G05D 23/1902 219/489 |
| 4,568,821 A * | 2/1986 | Boe | G05D 23/1905 219/419 |
| 5,660,328 A * | 8/1997 | Momber | G05D 23/1904 122/14.2 |
| 6,293,471 B1 | 9/2001 | Stettin et al. | |
| 6,350,967 B1 | 2/2002 | Scott | |
| 7,380,522 B2 | 6/2008 | Krell et al. | |
| 7,500,453 B2 | 3/2009 | Lindberg | |
| 7,744,008 B2 | 6/2010 | Chapman, Jr. et al. | |
| 7,798,107 B2 * | 9/2010 | Chian | F24H 9/2021 122/14.22 |
| 8,322,312 B2 * | 12/2012 | Strand | G05D 23/1919 122/14.22 |
| 8,813,687 B2 * | 8/2014 | Chaudhry | G05D 23/1904 122/14.1 |
| 2007/0179678 A1 * | 8/2007 | Nordberg | G05D 23/1917 700/300 |

(Continued)

FOREIGN PATENT DOCUMENTS

WO    WO94/02787    2/1994

*Primary Examiner* — Jason Mitchell
(74) *Attorney, Agent, or Firm* — Harness, Dickey & Pierce, P.L.C.

(57) ABSTRACT

A water heater that is controlled by a plurality of offsets depending on at least one of predicted current usage of the water heater and preset user set point temperature results in energy saving without affecting user comfort and eliminates the need for additional hardware. The average temperature of the water is lower than in the case where a single preset offset is adjusted, thereby resulting in energy saving.

14 Claims, 3 Drawing Sheets

(56) References Cited

U.S. PATENT DOCUMENTS

| | | | |
|---|---|---|---|
| 2008/0314999 A1* | 12/2008 | Strand | G05D 23/1919 236/20 R |
| 2010/0300377 A1* | 12/2010 | Buescher | F24H 9/2035 122/14.1 |
| 2012/0095614 A1* | 4/2012 | DeLayo | G05D 23/1904 700/300 |
| 2012/0271465 A1 | 10/2012 | Zobrist et al. | |
| 2013/0092102 A1* | 4/2013 | Chaudhry | G05D 23/1904 122/14.22 |
| 2013/0299600 A1* | 11/2013 | Beckers | F24H 1/185 237/8 A |
| 2014/0241708 A1* | 8/2014 | Chaudhry | F24H 9/2021 392/454 |

* cited by examiner

CONTROLLERS AND METHODS OF CONTROL OF WATER HEATERS

CROSS-REFERENCE TO RELATED APPLICATION

This application claims the benefit and priority of India Patent Application No. 2553/MUM/2013, filed Aug. 2, 2013. The entire disclosure of the above application is incorporated herein by reference.

FIELD

The present disclosure generally relates to water heaters and their operation.

BACKGROUND

This section provides background information related to the present disclosure which is not necessarily prior art.

Conventional water heater control is based on a preset user set point temperature and a fixed offset, which is the difference between the set point and the water temperature at which a heat call is generated. When the water temperature drops to a value which is a difference between the set point temperature and a predetermined offset value, the controller of the conventional water heater generates a heat call. This call for heat remains active till the water temperature reaches the preset user set point. Once the desired temperature is attained, the water temperature gradually starts decreasing due to hot water usage or heat loss and the cycle repeats.

Conventional water heaters are thus limited by a fixed offset that results in the generation of a heat call even under no usage or low usage conditions, which results in waste of electric or gas energy. Energy saving options available in the art for water heaters implement a change in the preset user set point based on water heater data that is sensed. A change in user set point results in discomfort to the user.

Water heater control typically includes different operating modes like vacation, warm, hot, very hot, and the like. Accordingly, the set point temperature is different for each of these modes to provide comfort. Hence, applying the same offset adjustment to every mode of operation may also result in discomfort for the user.

For instance, if the vacation mode set point is 70 degrees Fahrenheit and the very hot mode set point is 150 degrees Fahrenheit, applying the same offset to both modes may not be appropriate.

There is thus felt a need for controller and methods of control for water heaters that provide an energy efficient solution that does not compromise the user's comfort and at the same time is flexible enough to be implemented in any type of water heater.

As used herein, the expression 'user set point temperature' refers to a user expected water temperature. The expression 'offset' used herein refers to a value that when subtracted from the set point temperature provides a temperature at which a water heater generates a heat call. The expression 'water usage' used herein refers to the number of heat calls made in a predetermined time duration and the heat call ON time. These definitions are in addition to those expressed in the art.

SUMMARY

This section provides a general summary of the disclosure, and is not a comprehensive disclosure of its full scope or all of its features.

According to aspects of the present disclosure, exemplary embodiments are disclosed of controllers and methods of control for water heaters. In an exemplary embodiment, a controller for a water heater generally includes a base repository and a tracking repository. The base repository includes continually learned usage of the water heater including learned number of heat calls generated in a predetermined time duration and learned heat call ON time. The tracking repository includes current usage of the water heater including currently tracked number of heat calls made in the predetermined time duration and currently tracked heat call ON time. A comparator is adapted to compare the current usage of the water heater with the learned usage of the water heater to predict the current usage of the water heater as any one of High, Medium, Low, and No usage. The controller also includes first setting means to set a user set point temperature depending on user comfort and a second setting means to set a plurality of offsets comprising a first preset offset defining a temperature at which power is enabled when the High usage of the water heater is detected and at least one alternate offset defining a temperature at which power is enabled when at least one of the Medium, the Low and the No usage of the water heater is detected. A timer is adapted to set a predetermined time delay between the plurality of offsets. A processor is adapted to generate a heat call when the temperature of the water in the water heater drops from the preset user set point to at least one of the plurality of offsets, depending on at least one of the predicted current usage of the water heater and the preset user set point temperature.

In accordance with another aspect of the present disclosure, there are provided methods for controlling heat call generated in a water heater. In an exemplary embodiment, a method generally includes continually tracking current usage of the water heater including currently tracked number of heat calls made in a predetermined time duration and currently tracked heat call ON time, storing learned usage of the water heater including learned number of heat calls generated in the predetermined time duration and learned heat call ON time, and comparing the current usage of the water heater with the learned usage of the water heater to predict the current usage of the water heater as any one of High, Medium, Low, and No usage. The method may also include presetting a user set point temperature depending on user comfort, and presetting a plurality of offsets comprising a first preset offset defining a temperature at which power is enabled when the High usage of the water heater is detected and at least one alternate offset defining a temperature at which power is enabled when at least one of the Medium, the Low, and the No usage of the water heater is detected. The method may further include setting a predetermined time delay between the plurality of offsets, and generating a heat call when the temperature of the water in the water heater drops from the preset user set point to at least one of the plurality of offsets, depending on at least one of the predicted current usage of the water heater and the preset user set point temperature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
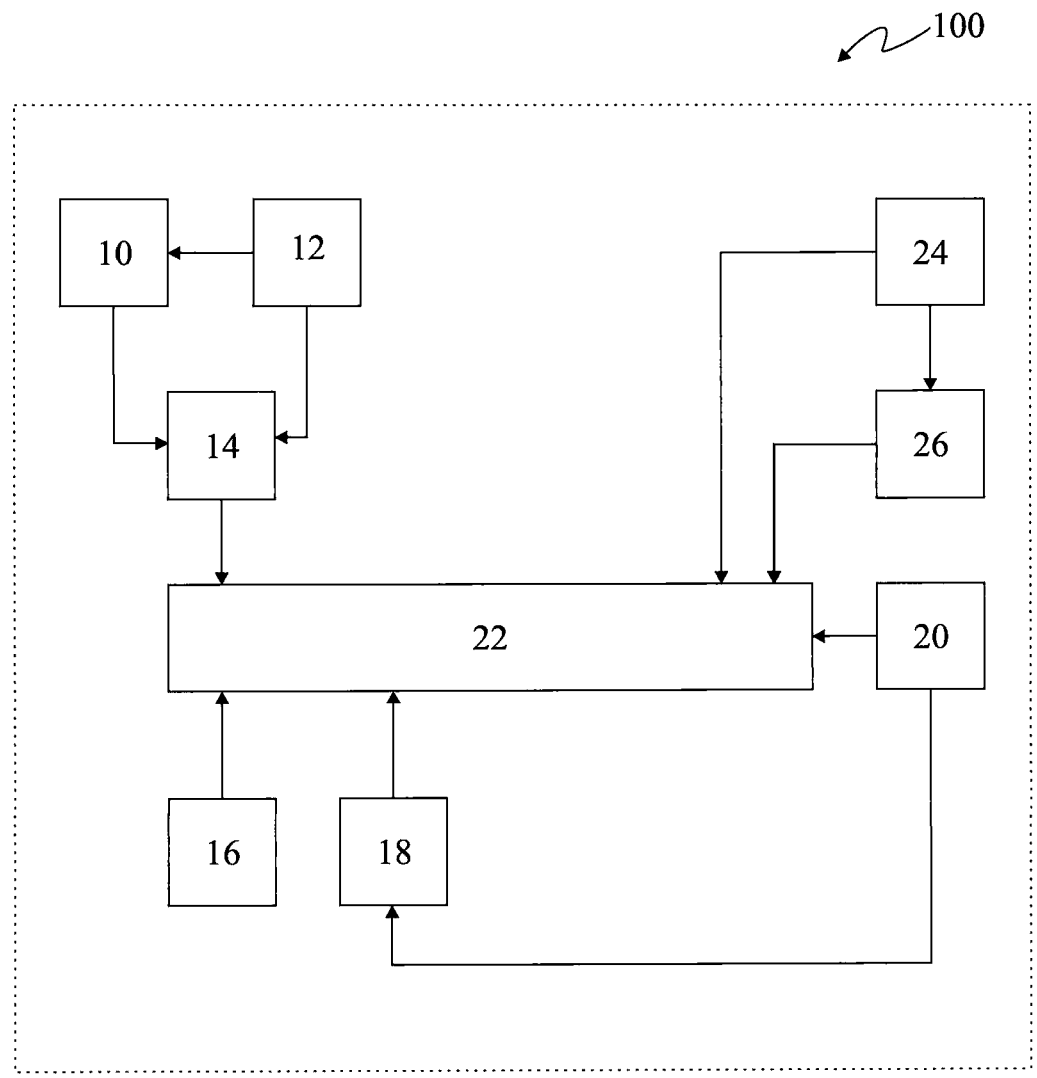
FIG. 1 illustrates a block diagram for an exemplary embodiment of a controller for a water heater in accordance with an aspect of the exemplary embodiment of the present disclosure.

Example embodiments will now be described more fully with reference to the accompanying drawings.

The controllers in conventional water heaters (gas or electric based) operate with a predetermined fixed offset. The water heater usage has no impact on the generated heat call. Hence, in case of low usage or no usage, controllers of conventional water heaters generate unnecessary heat calls due to heat loss, which eventually results in waste of electric or gas energy. Energy saving options known in the art involve adjustment of a user set point temperature based on sensed data like rate of change of water temperature. Modification of a user set point temperature is not an efficient solution because it may result in discomfort for the user. To overcome these drawbacks in conventional water heaters, an energy saving controller is envisaged that works on multiple offsets and at the same time does not compromise the user's comfort.

Accordingly, exemplary embodiments are disclosed of controllers and methods of control for water heaters. In an exemplary embodiment, a controller for a water heater generally includes a base repository and a tracking repository. The base repository includes continually learned usage of the water heater including learned number of heat calls generated in a predetermined time duration and learned heat call ON time. The tracking repository includes current usage of the water heater including currently tracked number of heat calls made in the predetermined time duration and currently tracked heat call ON time. A comparator is adapted to compare the current usage of the water heater with the learned usage of the water heater to predict the current usage of the water heater as any one of High, Medium, Low, and No usage. The controller also includes first setting means to set a user set point temperature depending on user comfort and a second setting means to set a plurality of offsets comprising a first preset offset defining a temperature at which power is enabled when the High usage of the water heater is detected and at least one alternate offset defining a temperature at which power is enabled when at least one of the Medium, the Low and the No usage of the water heater is detected. A timer is adapted to set a predetermined time delay between the plurality of offsets. A processor is adapted to generate a heat call when the temperature of the water in the water heater drops from the preset user set point to at least one of the plurality of offsets, depending on at least one of the predicted current usage of the water heater and the preset user set point temperature.

Optionally, the controller for a water heater may further comprise an override means adapted to override the at least one alternate offset, and a sensor adapted to sense rate of change of temperature of water.

Also disclosed are exemplary methods for controlling heat call generated in a water heater. In an exemplary embodiment, a method generally includes continually tracking current usage of the water heater including currently tracked number of heat calls made in a predetermined time duration and currently tracked heat call ON time, storing learned usage of the water heater including learned number of heat calls generated in the predetermined time duration and learned heat call ON time, and comparing the current usage of the water heater with the learned usage of the water heater to predict the current usage of the water heater as any one of High, Medium, Low, and No usage. The method may also include presetting a user set point temperature depending on user comfort, and presetting a plurality of offsets comprising a first preset offset defining a temperature at which power is enabled when the High usage of the water heater is detected and at least one alternate offset defining a temperature at which power is enabled when at least one of the Medium, the Low, and the No usage of the water heater is detected. The method may further include setting a predetermined time delay between the plurality of offsets, and generating a heat call when the temperature of the water in the water heater drops from the preset user set point to at least one of the plurality of offsets, depending on at least one of the predicted current usage of the water heater and the preset user set point temperature.

Optionally, the method may further include the steps of detecting rate of change of temperature of the water and overriding the at least one alternate offset.

The step of presetting a plurality of offsets may include the step of incrementing the first preset offset by a predetermined offset adjustment to define the at least one alternate offset. The step of generating a heat call facilitates reducing the average temperature of water in the water heater.

With reference now to the figures, a controller and a method for controlling heat call generated in a water heater in accordance with exemplary embodiments will be described. FIG. 1 illustrates a block diagram for the controller 100 in accordance with an aspect of the present disclosure, for a water heater. The controller comprises a base repository 10, a tracking repository 12, a comparator 14, first setting means 16, second setting means 18, a timer 20, and a processor 22.

The base repository 10 stores continually learned usage of the water heater. The usage of a water heater typically includes learned number of heat calls generated in a predetermined time duration and learned heat call ON time. The tracking repository 12 stores current usage of the water heater including currently tracked number of heat calls made in the predetermined time duration and currently tracked heat call ON time. The comparator 14 compares the current usage of the water heater with the learned usage of the water heater to predict whether the current usage of the water heater is High, Medium, Low, or No usage.

First setting means 16 enables the user to preset a user set point temperature depending on the user's comfort. Second setting means 18 enables the user to set a plurality of offsets comprising a first preset offset and at least one alternate offset. The first preset offset defines a temperature at which power is enabled when High usage of the water heater is detected. One or more alternate offsets define temperatures at which power is enabled when Medium, Low, or No usage of the water heater is detected. The user set point temperature is also a parameter on which the offsets are based.

The timer 20 sets a predetermined time delay between the plurality of offsets such that the first preset offset is incremented by a predetermined offset adjustment to define at least one alternate offset.

The processor 22 generates a heat call when the temperature of the water in the water heater drops from the preset user set point to the predetermined offset, depending on either the predicted current usage of the water heater and/or the preset user set point temperature.

Optionally, the controller 100 is provided with a sensor 24 to sense rate of change of temperature of water and override means 26 to override the predetermined alternate offset.

Figure 2:
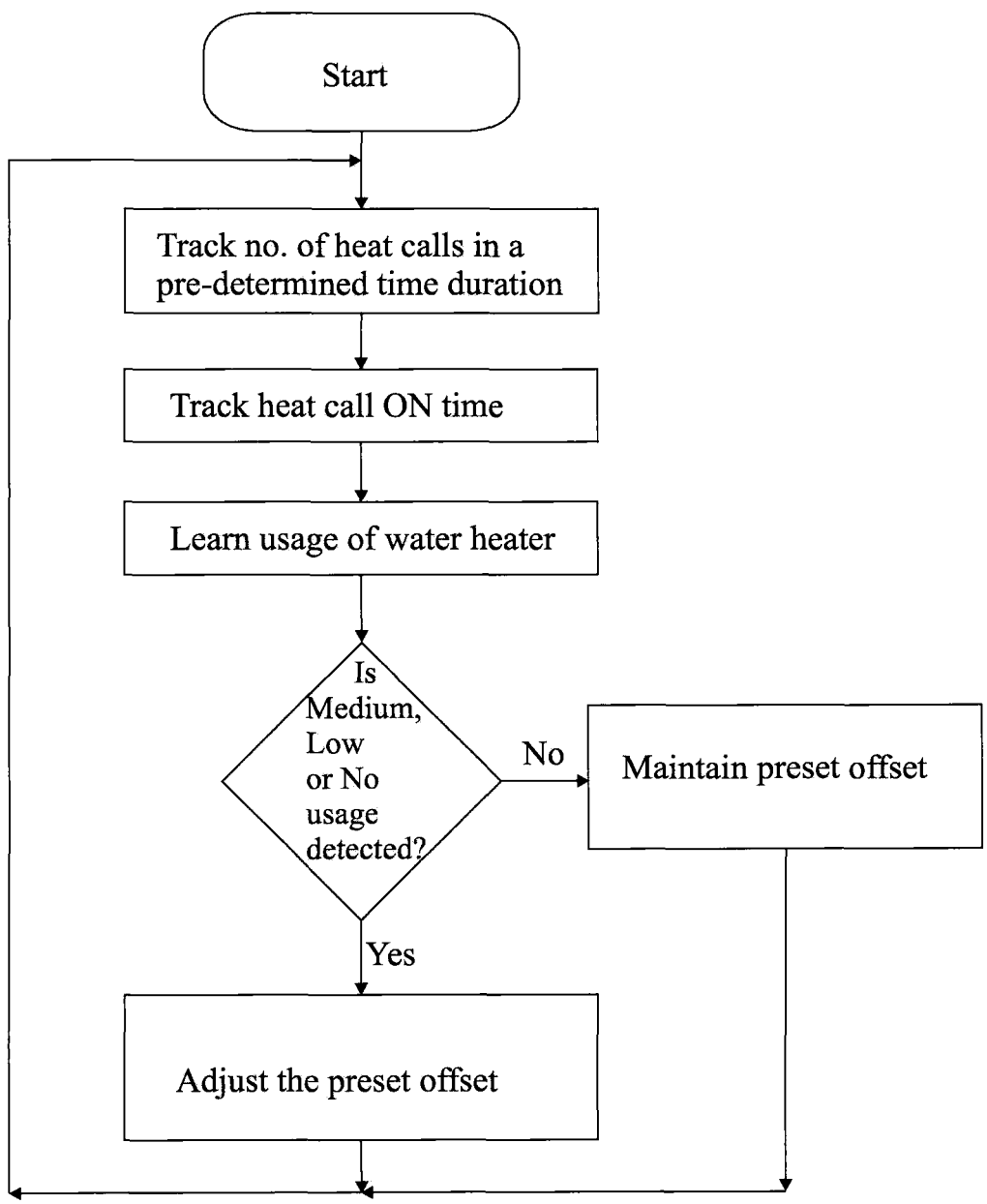
FIG. 2 illustrates a flow chart for an exemplary method of controlling heat call generated in a water heater in accordance with another aspect of the present disclosure.

FIG. 2 illustrates a flow chart for an exemplary method of controlling heat call generated in a water heater in accordance with another aspect of the present disclosure. The method comprises the step, process, or operation of continually tracking current usage of the water heater including currently tracked number of heat calls made in a predetermined time duration and currently tracked heat call ON time. The learned usage of the water heater including learned number of heat calls generated in the predetermined time duration and learned heat call ON time is stored for comparing with the current usage of the water heater to predict the current usage of the water heater as any one of High, Medium, Low, or No usage. A user set point temperature depending on user comfort is preset. Again, a plurality of offsets is preset. The plurality of offsets include a first preset offset that defines a temperature at which power is enabled when High usage of the water heater is detected and at least one alternate offset that defines a temperature at which power is enabled when either Medium, Low, or No usage of the water heater is detected. A predetermined time delay is set between the plurality of offsets such that the first preset offset is incremented by a predetermined offset adjustment to define at least one alternate offset. A heat call is generated when the temperature of the water in the water heater drops from the preset user set point to the predetermined offset depending on either the predicted current usage of the water heater and/or the preset user set point temperature.

Figure 3:
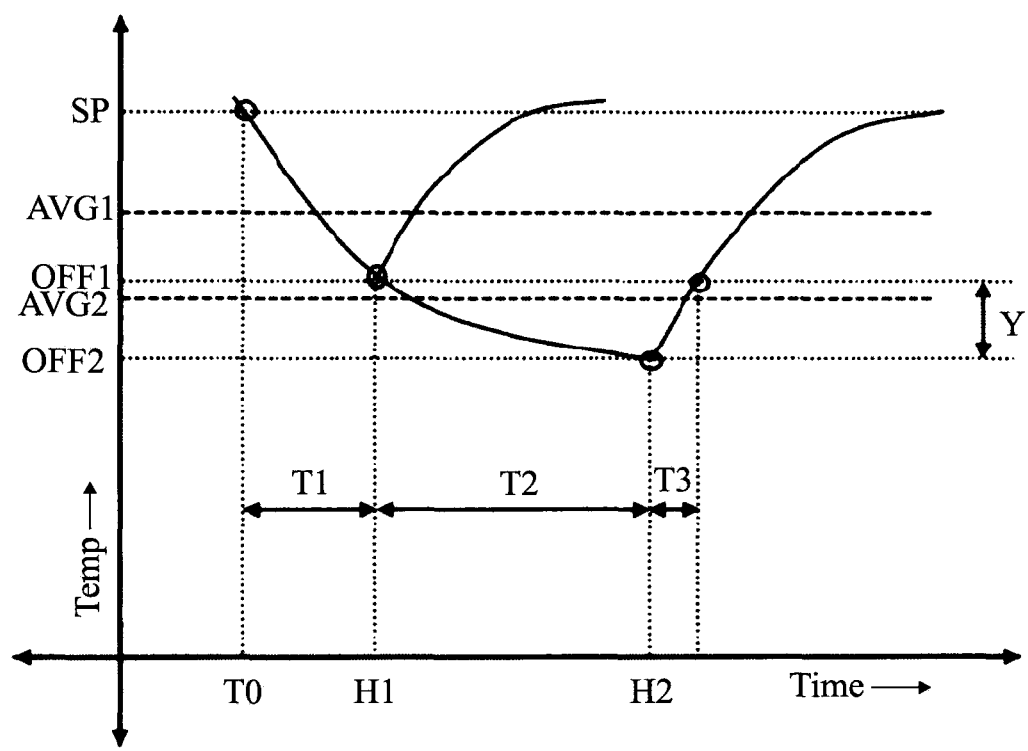
FIG. 3 illustrates a graphical representation of temperature versus time for a water heater in accordance with the present disclosure as compared to conventional water heaters.

FIG. 3 illustrates a graphical representation of temperature versus time for a water heater in accordance with the present disclosure as compared to conventional water heaters. T0 represents the time at which water temperature attains user set set-point value SP. T1 represents the time to generate next heat call due to heat loss/water usage during normal operation. T2 represents the extra time required to generate a heat call due to the incremented alternate offset value. T3 represents the extra time required to heat the water due to the incremented offset value. Y represents the incremented offset value (Y is always >0). OFF1 represents the first preset offset (fixed offset). OFF2 represents the alternate offset. AVG1 represents the average water temperature for a conventional water heater. AVG2 represents the average water temperature for a water heater employing the controller of the present disclosure operating with a plurality of offsets.

In an exemplary embodiment, if the user set point SP is 110 degrees Fahrenheit and the first preset offset OFF1 is 10 degrees Fahrenheit, when the water temperature is <=(set point SP−first preset offset OFF1), a heat call is generated. In this case, a heat call will generate at 100 degrees Fahrenheit (110° F.−10° F.).

The water temperature is at user set set-point value SP at time T0. During the time period T1, the water temperature starts gradually decreasing because of hot water usage or heat loss. In conventional water heaters, a heat call is generated at time H1.

In accordance with the present disclosure, the alternate offset OFF2 is preset based on water heater usage. In an exemplary embodiment, if OFF2 is set to 20° F., a heat call will generate at H2 (T1 +T2), when water temperature is <=90° F.

In this case, AVG2<AVG1. Since AVG2 is less, heat loss is less, heat loss being directly proportional to the difference between water temperature and ambient temperature. T2 will be considerably large and shall always be greater than T1. Because the water temperature is maintained at a lower average temperature without changing the user set point SP, the consumed heat will be lower.

The relation between water heater usage and the different offsets for High, Medium, Low, and No Usage of a water heater for a preset user set point temperature is explained using an exemplary table as indicated below:

| No. of Heat Calls | Water Heater Usage | Offset |
|---|---|---|
| >=11 | High | 10 (Default) |
| 6 to 10 | Medium | 15 |
| 3 to 5 | Low | 18 |
| <3 | No | 20 |

The above table merely showcases one of the 'n' number of probable methods of determining water heater usage. The method/algorithm for determining water heater usage may also be customer dependent. Again, offsets for High, Medium, Low, and No usage may also be customer dependent. The above values merely display the relation between water heater usage and the different offsets in accordance with an exemplary method. The number of heat calls in a predetermined time period (e.g., 24 hours, etc.) is not only dependent on actual number of heat calls generated by a water heater but is also dependent on heat call active time. Again, the adjusted offset is not based on water heater usage alone but is also based on the user set point.

Conventional water heaters provide energy saving solutions by changing the preset user set point based on water heater operational data. This may cause discomfort for the user in some cases as the preset user set point is changed to a new set point. But with controllers of the present disclosure, the offsets are adjusted based on water heater usage and not set point set by the user alone. There is therefore no compromise on user comfort. Also, controllers in accordance with the present disclosure can be implemented in both gas and electric based water heaters.

Exemplary embodiments of controllers and methods disclosed herein may provide one or more (but not necessarily any or all) of the following advantages. For example, exemplary embodiments of controllers and methods of control for water heaters may allow for reduced energy consumption. Exemplary embodiments may provide a water heater and a method of control for the water heater for reduced energy consumption without the need for any additional hardware. Exemplary embodiments may provide a water heater and a method of control for the water heater for reduced energy consumption without compromising the user's comfort. Exemplary embodiments may provide a low cost water heater and a method of control for the same with reduced energy consumption. Exemplary embodiments may provide a method of control for a water heater with reduced energy consumption that can be implemented in both gas and electric water heaters. Exemplary embodiments may provide an electric water heater and a method of control for the same with reduced energy consumption that improves life of the relay and the heating element. Exemplary embodiments may provide a gas water heater and a method of control for the same with reduced energy consumption that improves relay life. Exemplary embodiments may provide controllers and methods of control for water heaters that ameliorate one or more problems of the prior art and/or that at least provide a useful alternative.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. For example, the numerical values mentioned for the various physical parameters, dimensions, or quantities may only be approximations, and it is envisaged that the values higher/lower than the numerical values assigned to the parameters, dimensions, or quantities may fall within the scope of the disclosure, unless there is a statement in the specification specific to the contrary. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The use of the expression "at least" or "at least one" suggests the use of one or more elements or features, as the use may be in the embodiment of the disclosure to achieve one or more of the desired results.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Any discussion of documents, acts, materials, devices, articles or the like that has been included in this specification is solely for the purpose of providing context for the disclosure. It is not to be taken as an admission that any or all of these matters form part of the prior art base or were common general knowledge in the field relevant to the disclosure as it existed anywhere before the priority date of this application.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A controller for a water heater, the controller comprising:
    a base repository comprising continually learned usage of the water heater including learned number of heat calls generated in a predetermined time duration and learned heat call ON time;
    a tracking repository comprising current usage of the water heater including currently tracked number of heat calls made in the predetermined time duration and currently tracked heat call ON time;
    a comparator adapted to compare the current usage of the water heater with the learned usage of the water heater to identify the current usage of the water heater as any one of High, Medium, Low, and No usage;
    first setting means to set a user set point temperature based on user input;
    second setting means to set a plurality of user-selectable alternate offsets alternative to a first preset offset at which power is enabled when the High usage of the water heater is identified as the current usage, the alternate offsets each defining a set point temperature offset at which power is enabled when the current usage of the water heater is identified as a corresponding one of the Medium, the Low, and the No usage of the water heater; and
    a processor adapted to generate a heat call, depending on the identified current usage of the water heater and the preset user set point temperature, when (a) the temperature of the water in the water heater drops from the preset user set point to the first preset offset or (b) after a predetermined time delay corresponding to one of the alternate offsets, the time delay predetermined to allow a drop of temperature of the water in the water heater from the preset user set point temperature to the corresponding user-selected alternate offset.

2. The controller for a water heater of claim 1, further comprising:
    an override means adapted to override the at least one alternate offset; and
    a sensor adapted to sense rate of change of temperature of water.

3. The controller of claim 1, installed in the water heater.

4. The controller of claim 1, configured for a gas-based water heater.

5. The controller of claim 1, configured for an electric-based water heater.

6. A controller-performed method for controlling heat call generated in a water heater, the method comprising:
    continually tracking current usage of the water heater including currently tracked number of heat calls made in a predetermined time duration and currently tracked heat call ON time;
    storing learned usage of the water heater including learned number of heat calls generated in the predetermined time duration and learned heat call ON time;
    comparing the current usage of the water heater with the learned usage of the water heater to identify the current usage of the water heater as any one of High, Medium, Low, and No usage;
    presetting a user set point temperature based on user input;
    presetting a plurality of user-selected alternate offsets alternative to a first preset offset defining a temperature at which heating is enabled when the High usage of the water heater is identified as the current usage, the alternate offsets each defining a set point temperature offset at which heating is enabled when the current usage is identified as a corresponding one of the Medium, the Low, and the No usage of the water heater; and
    based on the identified current usage, generating a heat call (a) when the temperature of the water in the water heater drops from the preset user set point to the first preset offset or (b) after a predetermined time delay corresponding to one of the alternate offsets, the time delay predetermined to allow a drop of temperature of the water in the water heater from the preset user set point temperature to the corresponding user-input alternate offset.

7. The method of claim 6, further comprising:
    detecting rate of change of temperature of the water; and
    overriding at least one alternate offset.

8. The method of claim 6, wherein presetting a plurality of offsets includes incrementing the first preset offset by a predetermined offset adjustment to define at least one alternate offset.

9. The method of claim 6, wherein generating the heat call is performed to reduce the average temperature of water in the water heater.

10. The method of claim 6, wherein:
    presetting a plurality of offsets includes incrementing the first preset offset by a predetermined offset adjustment to define the at least one alternate offset;
    generating the heat call is performed to reduce the average temperature of water in the water heater; and
    the method further comprises:
        detecting rate of change of temperature of the water; and
        overriding at least one alternate offset.

11. The method of claim 6, wherein the water heater is a gas based water heater.

12. The method of claim 6, wherein the water heater is an electric based water heater.

13. A water heater comprising:
    a controller having a base repository for storing continually learned usage of the water heater over a predetermined time duration, a tracking repository for storing current usage of the water heater, and a comparator configured to compare the current usage of the water heater with the learned usage to identify the current usage of the water heater as being in any one of a plurality of usage categories including a High usage category;
    a first offset being a preset offset defining a temperature at which the water heater is to begin heating the water when High usage of the water heater is identified by the controller as the current usage, and at least one user-input alternative offset defining a corresponding temperature at which the water heater is to begin heating the water when the current usage is identified by the controller as a corresponding usage category of the water heater other than High usage;

the water heater configured to generate a call for heat, depending on the identified current usage of the water heater and a preset user set point temperature, when (a) the temperature of the water in the water heater drops from the preset user set point temperature to the first preset offset or (b) after a time delay corresponding to one of the at least one alternative offsets, the time delay predetermined to allow a drop of temperature of the water in the water heater from the preset user set point temperature to the corresponding one of the at least one alternative offset.

14. The water heater of claim 13, comprising a gas-based water heater or an electric-based water heater.

* * * * *